US011478730B2

(12) United States Patent
Hagen

(10) Patent No.: US 11,478,730 B2
(45) Date of Patent: Oct. 25, 2022

(54) FILTER PRESS ASSEMBLY

(71) Applicant: M.W. Watermark, L.L.C., Holland, MI (US)

(72) Inventor: Andrew Lewis Hagen, Holland, MI (US)

(73) Assignee: M.W. WATERMARK, L.L.C., Holland, MI (US)

( * ) Notice: Subject to any disclaimer, the term of this patent is extended or adjusted under 35 U.S.C. 154(b) by 204 days.

(21) Appl. No.: 17/064,891

(22) Filed: Oct. 7, 2020

(65) Prior Publication Data

US 2021/0178295 A1 Jun. 17, 2021

Related U.S. Application Data

(60) Provisional application No. 62/947,221, filed on Dec. 12, 2019.

(51) Int. Cl.
*B01D 25/21* (2006.01)
*B01D 25/30* (2006.01)

(52) U.S. Cl.
CPC ......... *B01D 25/215* (2013.01); *B01D 25/305* (2013.01); *B01D 2201/202* (2013.01)

(58) Field of Classification Search
CPC ................ B01D 25/215; B01D 25/305; B01D 2201/202
See application file for complete search history.

(56) References Cited

U.S. PATENT DOCUMENTS

| 4,486,305 A | 12/1984 | Nakamura |
| 2008/0087594 A1 | 4/2008 | Hermann et al. |
| 2013/0284655 A1 | 10/2013 | Nakagawa et al. |

FOREIGN PATENT DOCUMENTS

| CN | 205867681 U | 1/2017 | |
| CN | 108757298 A | 11/2018 | |
| EP | 0579103 A2 | 1/1994 | |
| GB | 1392030 A * | 4/1975 | ........... B01D 25/215 |
| KR | 101919566 B1 | 11/2018 | |
| WO | WO-2018093783 A1 * | 5/2018 | |
| WO | 20190008037 A1 | 1/2019 | |

* cited by examiner

*Primary Examiner* — Liam Royce
(74) *Attorney, Agent, or Firm* — McGarry Bair PC

(57) ABSTRACT

An assembly for a filter press can include a plate body having spaced first and second sides defining an axial direction, and a fluid channel extending through the plate body in the axial direction between the first and second sides. A fastener can be provided in the assembly with a first end extending from the first side of the plate body.

20 Claims, 4 Drawing Sheets

FILTER PRESS ASSEMBLY

CROSS-REFERENCE TO RELATED APPLICATIONS

This application claims priority to U.S. Provisional Patent Application No. 62/947,221, filed Dec. 12, 2019, which is incorporated herein by reference in its entirety.

BACKGROUND

Filter presses can be utilized to remove solids from a particle-laden fluid via multiple filtering stages compressed under pressure. The filtering stages can include multiple components sized for a variety of fluid types and viscosities, wherein solids carried by the fluid are collected into compact form for later removal from the filter press. Cleaned fluid or filtrate can be directed out of the filter press for collection or for further refinement.

BRIEF DESCRIPTION

In one aspect, the disclosure relates to a connection plate assembly for a filter press. The connection plate assembly includes a plate body having spaced first and second sides defining an axial direction, a fluid channel extending through the plate body in the axial direction between the first and second sides, an annular recess within the plate body, surrounding and spaced from the fluid channel, and a fastener having a first end extending from the first side of the plate body and a second end located within the annular recess, the fastener being fluidly separated from the fluid channel.

In another aspect, the disclosure relates to a filter press. The filter press includes a support frame, a feed inlet channel extending in a first direction and configured to receive a particle-laden fluid, at least one filtrate outlet channel extending in a second direction opposite the first direction and configured to receive a cleaned fluid, a press skeleton having a connection point to the support frame, a filtering assembly including a filter plate with a filter fluidly coupled to the feed inlet channel and the at least one filtrate outlet channel, and a connection plate assembly having a first side coupled to the press skeleton and a second side coupled to the filtering assembly. The connection plate assembly includes a plate body having a fluid channel extending between the first and second sides, an annular recess within the plate body, surrounding and spaced from the fluid channel, and a fastener having a first end extending from the first side of the plate body and a second end located within the annular recess, the fastener being fluidly separated from the fluid channel.

DETAILED DESCRIPTION

Figure 1:
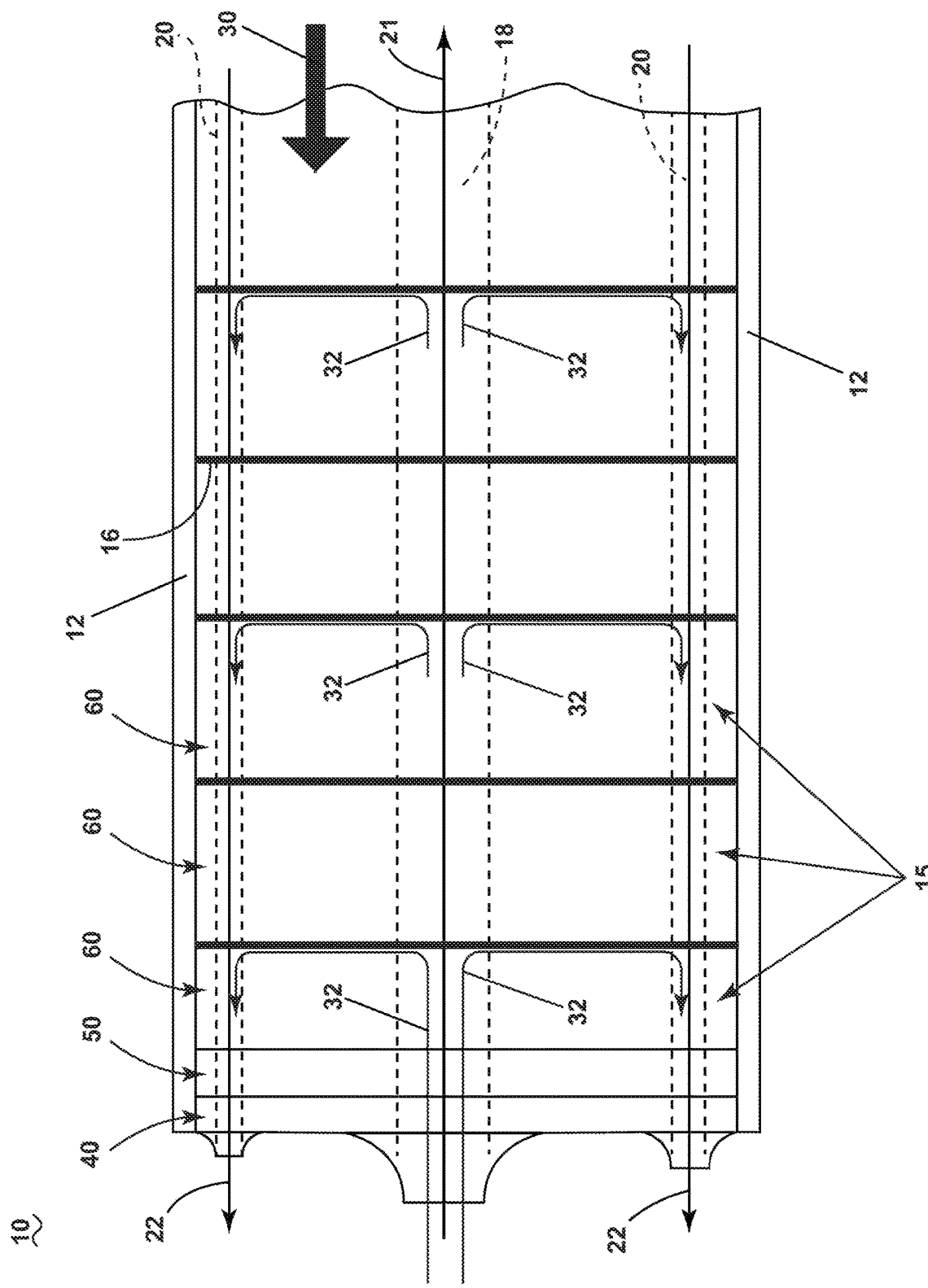
FIG. 1 is a schematic top view of a filter press in accordance with various aspects described herein.

Aspects of the disclosure generally relate to an assembly for a filter press. Filter presses are generally known for use in separating solids and liquids, wherein a "slurry" of particle-laden liquid is fed or directed through a plurality of filtering elements within the press, and a cleaned fluid known as filtrate flows out of the press. Such cleaned fluid or filtrate may contain particles smaller than a predetermined size captured by the filtering elements, depending on factors such as a size, type, or amount of filtering elements utilized. For example, some filters may capture or trap particles greater than 500 micrometers while allowing smaller particles to pass through the filter and remain in the filtrate. Such filter presses can further include a component to apply pressure to a plurality of stacked filtering elements in an effort to maximize an amount of extracted filtrate from the slurry.

A variety of liquids can be filtered through a filter press, including water, acidic liquids, or alkaline liquids, and such liquids can be filtered at cooled or heated temperatures. Elements of the filter press may be exposed to the slurry liquid during operation, and the environment of the slurry liquid can cause wear and tear on such exposed elements.

While "a set of" various elements will be described, it will be understood that "a set" can include any number of the respective elements, including only one element. As used herein, the terms "axial" or "axially" refer to a dimension along a longitudinal axis of a component or referential description or along a longitudinal axis of a component. As used herein, the terms "radial" or "radially" refer to a dimension extending between a center longitudinal axis of a component or referential description, an outer circumference, or a circular or annular component disposed relative to a component or referential description. The use of the terms "proximal" or "proximally," either by themselves or in conjunction with the terms "radial" or "radially," refers to moving in a direction toward or away from the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, welded, joined, etc.) are to be construed broadly and can include intermediate members between a collection of elements and relative movement between elements unless otherwise indicated. As such, connection references do not necessarily infer that two elements are directly connected and in fixed relation to each other.

The exemplary drawings are for purposes of illustration only and the dimensions, positions, order and relative sizes reflected in the drawings attached hereto can vary.

FIG. 1 illustrates a schematic diagram of an exemplary filter press 10. It will be understood that the filter press 10 can have a variety of forms and can include other known elements not explicitly described as will be understood by a person of skill in the art.

The filter press 10 is shown in a top view and includes a support frame 12 that houses at least one filtering assembly 15. A press skeleton 40 is positioned at one end of the filter press 10 and secured to the support frame 12. A connection plate assembly 50 is coupled to the press skeleton 40, and multiple filtering assemblies 15 can be coupled to the connection plate assembly 50 to form a stack within the filter press 10. While one connection plate assembly 50 is illustrated, any number of connection plate assemblies 50 can be provided in the filter press 10, including two or more. For example, a connection plate assembly 50 can be provided at either end of a stack of filtering assemblies 15 for coupling to corresponding ends of the support frame 12, including to a follower (not shown) at the opposite end of the support frame 12 compared to the press skeleton 40.

Each filtering assembly 15 can include a filter plate 60 carrying at least one filter 16, such as a filter cloth. The filters 16 are illustrated at an outer edge of the filter plate 60 for visual clarity. A filter plate 60 can carry a filter 16 adjacent either or both outer edges as desired. It will be understood that the filtering assemblies 15 can further include a variety of plates, filters, frames, connectors, or other components not explicitly shown. In one example, a filtering assembly can include a filter plate containing a recessed portion within which a filter cloth can be seated. In another example, the filter can extend fully along one side of the filter plate in the filtering assembly. In yet another example, a filter can be provided internally within the filtering assembly. In still another example, the filtering assembly can include a compressible diaphragm or membrane filter plate, where the width of the filtering assembly can vary under application of a clamping force.

A feed inlet channel 18 can extend in a first direction 21 through the filter press 10. At least one filtrate outlet channel 20 can extend in a second direction 22 opposite the first direction 21 through the filter press 10. In the example shown, the feed inlet channel 18 is located at the center of the filter press 10, and the fluid outlet channels 20 are located radially outward of the feed inlet channel 18. The filtering assemblies 15 can be positioned within the support frame 12. While illustrated in a central position, the feed inlet channel 18 can be located anywhere within the filter press 10, including at an off-center position. In addition, any number of feed inlet channels 18 or filtrate outlet channels 20 can be provided in the filter press extending in any suitable direction, including in a parallel flow or counter flow configuration. Furthermore, other elements not explicitly shown can nonetheless be included in the filter press 10 including various conduits, support structures, attachment hardware, and other components as known in the art. While not shown, it is further contemplated that multiple feed inlet channels can be provided through the filter press 10, such as a first feed inlet channel for flowing in a first direction and a second feed inlet channel for flowing in a second direction opposite the first direction.

During operation, a force 30 such as a clamping force can be applied to the stacked filtering assemblies 15, connection plate 50, and press skeleton 40 while slurry flows through the feed inlet channel 18 along the first direction 21. Solids can be collected by successive filters 16. The force 30 can aid in extracting cleaned liquid while the solids accumulate on the filters 16. In the example shown, the force 30 is applied in the second direction 22, and it will be understood that the force 30 can be applied in any suitable direction. Solids removed from the slurry can accumulate along the filters 16. Cleaned liquid or filtrate illustrated by arrows 32 can flow away from the feed inlet channel 18, such as directly through the filters 16 or within each filtering assembly 15, after filtration. The cleaned liquid can then enter the filtrate outlet channels 20 and flow in the second direction 22 for collection. In one non-limiting example of operation, filtrate outlet channels 20 can be provided at four corners of a filtering assembly 15, where cleaned liquid can flow within the filter plate 60 toward two of the filtrate outlet channels 20 and also flow through the filter 16 toward all four filtrate outlet channels 20.

Figure 2:
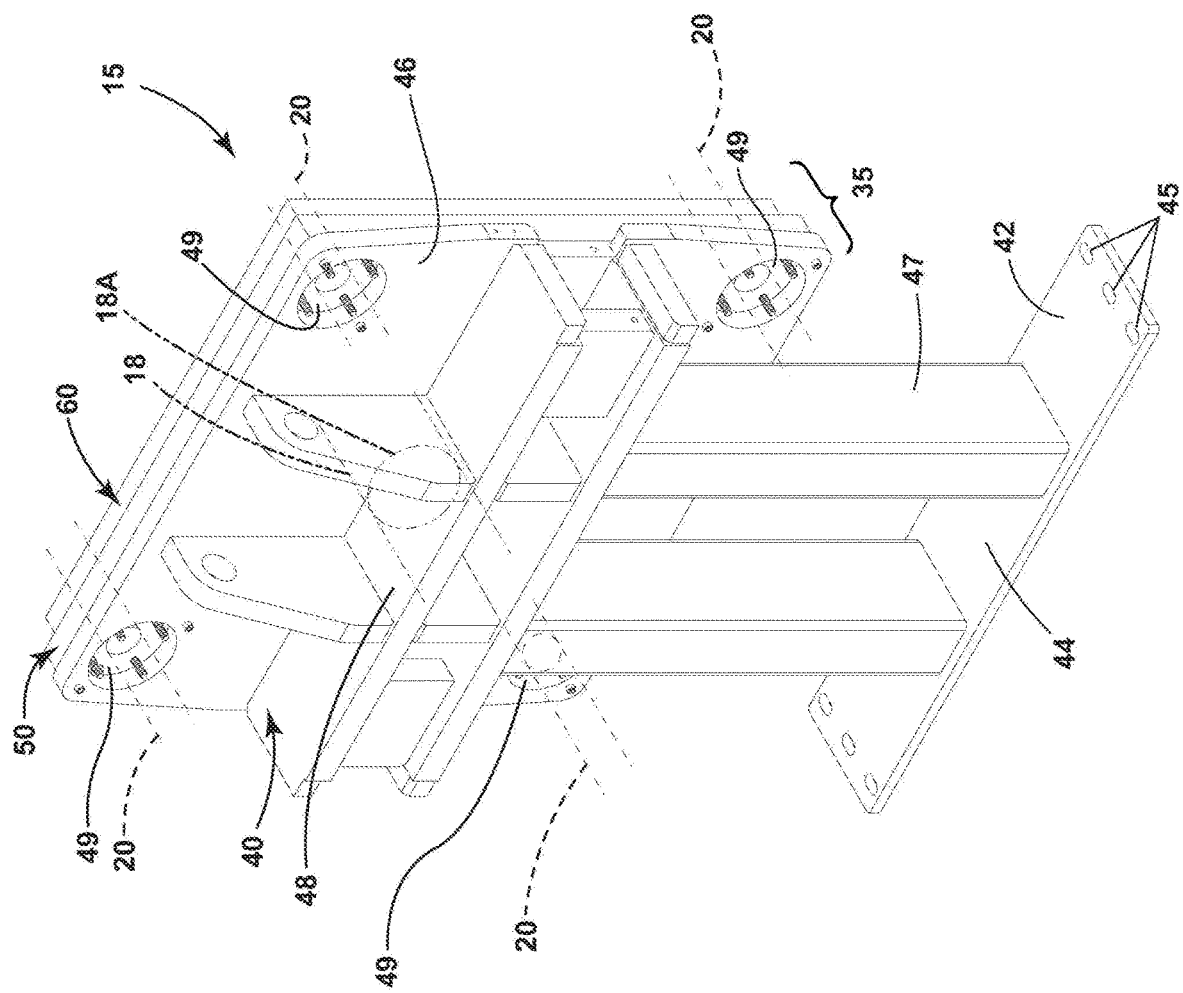
FIG. 2 is a perspective view of a press skeleton, connection plate assembly, and filtering assembly that can be utilized in the filter press of FIG. 1.

Referring now to FIG. 2, one press skeleton 40, connection plate 50, and filtering assembly 15 is illustrated that can be utilized in the filter press 10 of FIG. 1. In the example shown, the press skeleton 40 includes a connection point 42 in the form of a bar 44 with apertures 45 that can be utilized to secure the press skeleton 40 to the support frame 12, such as with bolts or screws. The press skeleton 40 can also include a plate 46 coupled to the bar 44 via legs 47. Optionally, the press skeleton 40 can include a support structure 48 coupled to the legs 47 and plate 46. In the example shown, the support structure 48 is in the form of interlocking crossbars spanning the plate 46 for added structural support.

The press skeleton 40 can further include a recessed portion 49 that at least partially defines the filtrate outlet channel 20, as well as a feed aperture 18A that at least partially defines the feed inlet channel 18. In the example shown, the filter press 10 (FIG. 1) includes a central feed inlet channel 18 and four filtrate outlet channels 20 radially outward of the feed inlet channel 18. Accordingly, the press skeleton 40 in the illustrated example includes the feed aperture 18 at a central location of the plate 46 corresponding to the feed inlet channel 18, and four recessed portions 49 corresponding to the four filtrate outlet channels 20. It should be understood that in the schematic diagram of FIG. 1, each filtrate outlet channel 20 can represent multiple, spaced filtrate outlet channels that visually overlap in the side view.

The connection plate assembly 50 can be positioned between the press skeleton 40 and filtering assembly 15. In the example shown, the filtering assembly 15 includes a filter plate 60. Any suitable material can be utilized for the press skeleton 40, connection plate assembly 50, and filter plate 60, including metals, polymers, fiberglass, composite materials, or the like. In one non-limiting example, the press skeleton 40 can be formed of steel, and the connection plate assembly 50 and filter plate 60 can be formed of a polymeric material such as polypropylene. While not shown for brevity, the connection plate assembly 50 and filter plate 60 can also include respective feed apertures in registry with the feed aperture 18A and at least partially defining the feed inlet channel 18 (FIG. 1).

Figure 3:
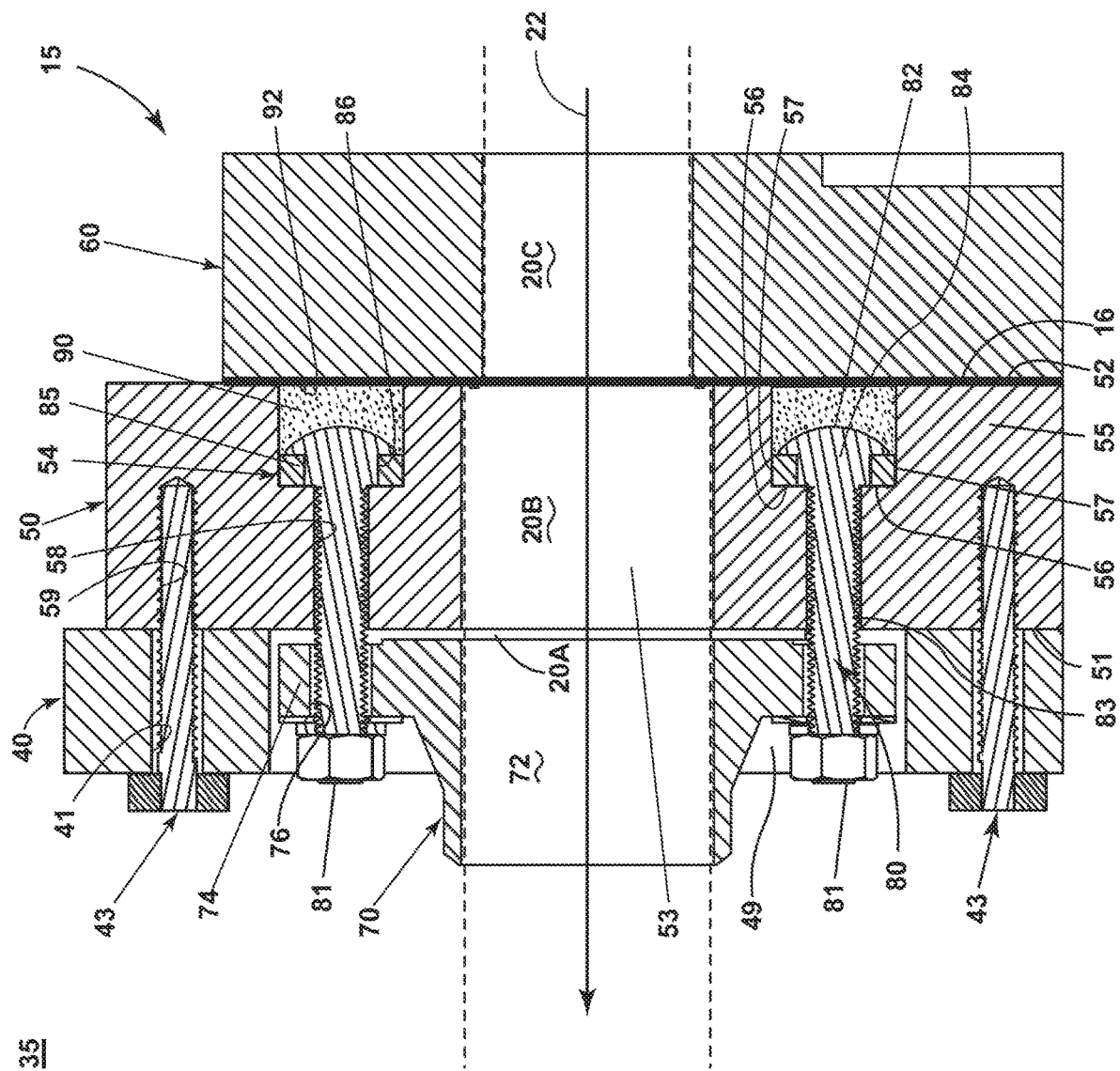
FIG. 3 is a side cross-sectional view of a portion of the press skeleton, connection plate assembly, and filtering assembly of FIG. 2.

Turning to FIG. 3, a portion 35 of the filter press 10 is shown in cross section. The portion 35 illustrated in FIG. 3 includes the press skeleton 40, connection plate 50, and filtering assembly 15, with one filtrate outlet channel 20 passing through the portion 35. Aspects of the disclosure can also be applied to other portions of the filter press 10 including the feed inlet channel 18.

The press skeleton 40, connection plate assembly 50, and filter plate 60 can include four respective filtrate apertures 20A, 20B, 20C that at least partially define the filtrate outlet channels 20. The filtrate apertures 20A, 20B, 20C are in registry with one another. In the example of FIG. 3, the filtrate apertures 20A and 20B are shown having the same diameter while the filtrate aperture 20C is shown with a smaller diameter. It is contemplated that the three filtrate apertures 20A, 20B, 20C can have the same or differing diameters and can be of any suitable cross-sectional shape.

The press skeleton 40 can further include at least one outer aperture 41 configured to receive an outer fastener 43. In the example shown, the outer fastener 43 includes a nut and bolt, and can also include a screw, pin, snap-fit connector, or the like, in non-limiting examples. The outer fastener 43 can be utilized to secure the press skeleton 40 to the connection plate assembly 50.

A connection pipe 70 can be disposed within the recessed portion 49 of the press skeleton 40. The connection pipe 70 can include a central pipe channel 72 and a flange 74 with at least one flange aperture 76. The central pipe channel 72 can be in registry with the filtrate apertures 20A, 20B, 20C and can also at least partially form the filtrate outlet channel 20.

The connection plate assembly 50 can include a plate body 55 with a first side 51 coupled to the filtering assembly 15 at the filter plate 60, as well as a second side 52 coupled to the press skeleton 40 as shown. The connection plate assembly 50 can further include a fluid channel 53 defined by the filtrate aperture 20B and extending between the first side 51 and second side 52. The fluid channel 53 can be configured to receive any fluid, including slurry or filtrate. In the example shown, the fluid channel 53 at least partially defines the filtrate outlet channel 20 and is configured to receive a cleaned fluid or filtrate.

An annular recess 54 can be formed within the plate body 55. The annular recess 54 can surround, and be spaced from, the fluid channel 53. The annular recess 54 can be formed by an inner surface 56 and an axial wall 57 joined to the inner surface 56. The inner surface 56 is spaced from the second side 52 of the plate body 55 as shown. Optionally, the axial wall 57 can extend to the second side 52. In another example (not shown), the axial wall can extend partway toward the second side such that annular recess is fully embedded within the plate body. In addition, at least one recess aperture 58 can be formed in the plate body 55 between the first side 51 and the inner surface 56 of the recess 54. In the example shown, multiple recess apertures 58 can be provided about the annular recess 54.

In addition, the plate body 55 can further include outer apertures 59 in registry with the outer apertures 41 of the press skeleton 40. The outer fastener 43 can extend through the outer apertures 41, 59 to secure the plate body 55 to the press skeleton 40.

A fastener 80 having a first end 81 and a second end 82 can be included in the connection plate assembly 50. In the example shown, multiple fasteners 80 are located within corresponding recess apertures 58 such that the first end 81 extends from the first side 51 of the plate body 55, and the second end 82 is located within the annular recess 54. The fastener 80 can be formed of any suitable material, including metal or plastic in non-limiting examples. The fastener 80 can be any suitable fastener, such as any style of bolt, screw, or snap-fit connector. For example, the first end 81 of the fastener 80 can include a connecting portion 83 configured to secure to a component of the filter press 10, and the second end 82 can include a head portion 84 located within the annular recess 54. In the illustrated example, the fastener 80 is in the form of a bolt with the connecting portion 83 having threads and the head portion 84 having a hemispherical head.

It is contemplated that the fasteners 80 can be at least partially embedded within the plate body 55. For example, the second end 82 can be embedded within the annular recess 54 while the first end 81 projects from the plate body 55. In an example where the plate body 55 is formed of a polymeric material, the fasteners 80 can be positioned within a mold while the plate body 55 is injection-molded around the fasteners 80. In another example, the recess apertures 58 can be machined into the plate body 55 before positioning the fasteners 80 therein.

In the example shown, a ring 85 can also be included in the connection plate 50. The ring 85 is disposed within the annular recess 54 and formed of any suitable material, such as metal or plastic. The ring 85 can also be coupled to the second end 82 of the fastener 80, such as by welding, adhesives, or any other suitable coupling mechanism. The ring 85 can include a ring aperture 86 through which the fastener 80 can be inserted, for example with the head portion 84 abutting or contacting the ring 85.

Optionally, the connection plate assembly 50 can further include a seal 90 within the annular recess 54. The seal 90 can cover over the ring 85 and second end 82 of the fastener 80. The seal 90 can also partially or completely fill the annular recess 54. For example, the seal 90 can have an outer surface 92 that is coplanar with the second side 52 of the plate body 55 and confronts the filter plate 60. Any suitable material is contemplated for use with the seal 90, such as an injection-molded polymeric material or a metallic material, in non-limiting examples.

The filter plate 60 is illustrated in simplified form for clarity. For example, the filter plate 60 can be in the form of a membrane plate or a plate-and-frame construction. While not shown in FIG. 3, the filter plate 60 can be fastened or secured to the connection plate assembly 50 via any suitable mechanism including attachment hardware such as bolts, or interlocking/complementary facing surfaces of the filter plate 60 and plate body 55. In another example, the filter plate 60 can include an independent attachment to the support frame 12 (FIG. 1), such that the filter plate 60 can be slid apart or otherwise separated from the connection plate assembly 50.

When assembled, the filter 16 can be carried by the filter plate 60 and positioned between the filter plate 60 and connection plate assembly 50. The ring 85 can be located within the annular recess 54, and the connection pipe 70 can be positioned within the recessed portion 49 of the press skeleton 40. The fastener 80 can extend through the ring aperture 86, recess aperture 58, and flange aperture 76 of the connection pipe 70. For example, the connection pipe 70 can be threaded onto the embedded fasteners 80 extending out of, and projecting from, the connection plate assembly 50. The outer fastener 43 can extend through the outer aperture 41 of the press skeleton 40 as well as the outer aperture 59 of the connection plate assembly 50. In this manner, the connection plate assembly 50 can be secured to the connection pipe 70 as well as the plate 46 of the press skeleton 40.

Figure 4:
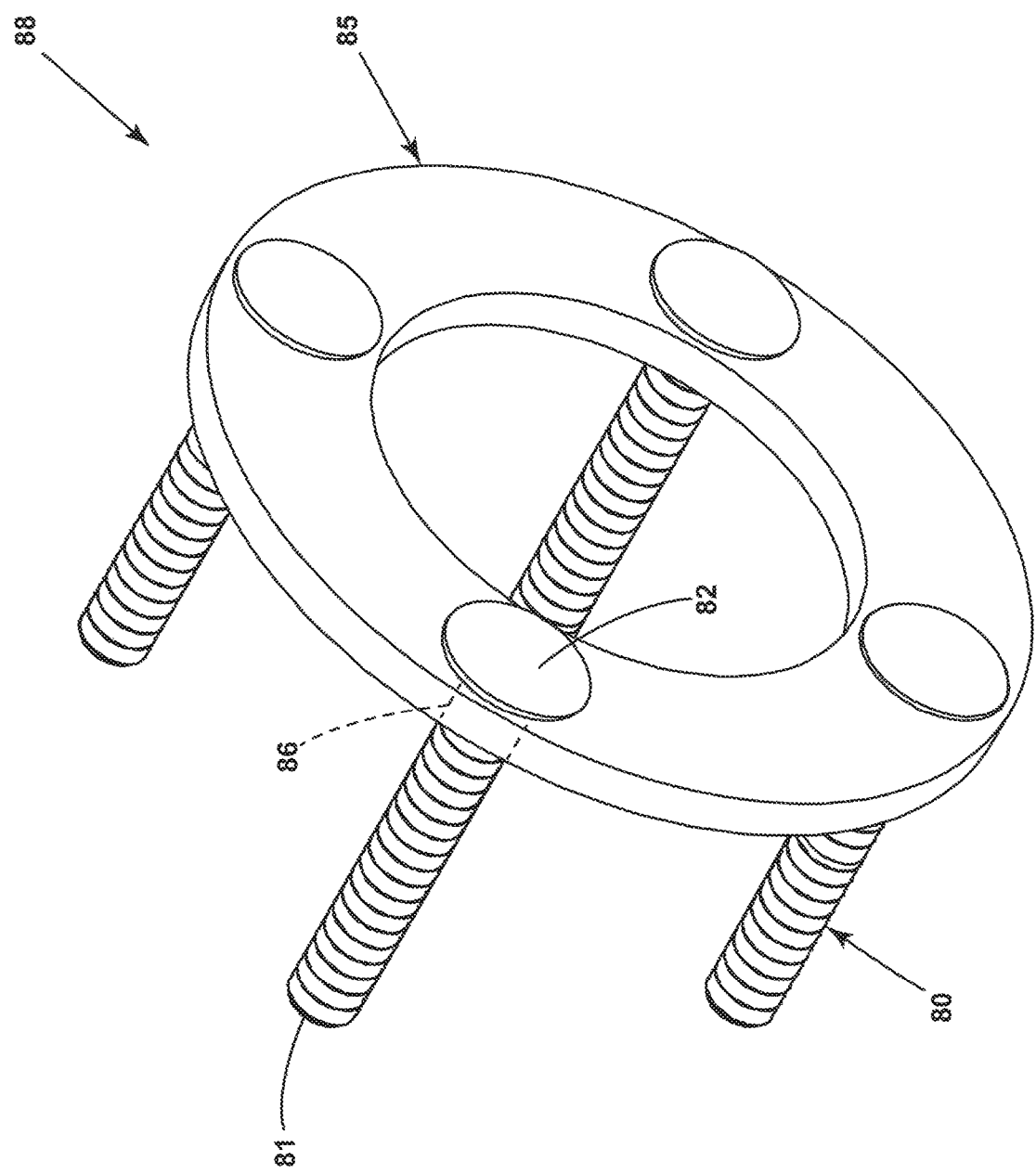
FIG. 4 is a perspective view of a ring and fastener that can be utilized in the connection plate assembly of FIG. 2.

Referring now to FIG. 4, one example of the ring 85 and fasteners 80 is illustrated in isolation from the connection plate assembly 50 (FIG. 3). In the example shown, four fasteners 80 are inserted through corresponding ring apertures 86, and the ring 85 is coupled to the fasteners 80. It is contemplated that the ring 85 and fasteners 80 can form a ring assembly 88 that can be inserted as one piece into the annular recess 54. In one example, the ring 85 can be welded to the fasteners 80. In another example, the ring assembly 88 can be formed as a seamless, unitary body having the ring 85 and fasteners 80, such as by casting, injection molding, or other suitable manufacturing methods.

Benefits of the above described aspects include that the connection plate assembly can be securely fastened to the press skeleton by way of the outer fasteners while being configured to receive a variety of connection pipes having their own, independent connection to the connection plate assembly. Such an independent connection can simplify a filter press assembly process wherein one connection pipe can be easily swapped for another compared to traditional filter presses. Additionally, in an example where connection pipes are acquired by a third party and installed in the filtering assembly, such an independent connection can provide for a simplified assembly by way of specifying only a maximum pipe channel diameter and flange type for fastening. It can be appreciated that simplifying an assembly process can improve process efficiencies and reduce costs.

Another benefit of the above described aspects is the fluid separation of connection hardware between adjacent plates of the filtering assembly from the cleaned fluid flowing through the filtrate outlet channels. In some environments, the cleaned fluid can be heated, corrosive, or otherwise capable of causing undesirable wear on connection hardware exposed to the fluid flow. Compared to traditional threaded-pipe assemblies, formation of a fluid channel in a plate body that can withstand exposure to the filtrate and separation of the connection hardware from the fluid channel can provide for improved part lifetimes while keeping hardware costs down, as traditional metallic hardware can still be utilized when separating "harsh" fluids or slurries.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and modification are possible within the scope of the forgoing disclosure and drawings without departing from the spirit of the disclosure, which is defined in the appended claims.

What is claimed is:

1. A filter press, comprising:
   a support frame;
   a feed inlet channel extending in a first direction and configured to receive a particle-laden fluid;
   at least one filtrate outlet channel extending in a second direction opposite the first direction and configured to receive a cleaned fluid;
   a press skeleton having a connection point to the support frame;
   a filtering assembly including a filter plate with a filter fluidly coupled to the feed inlet channel and the at least one filtrate outlet channel; and
   a connection plate assembly having a first side coupled to the press skeleton and a second side coupled to the filtering assembly, the connection plate assembly comprising:
      a plate body having a fluid channel extending between the first and second sides;
      an annular recess within the plate body, surrounding and spaced from the fluid channel; and
      a fastener having a first end extending from the first side of the plate body and a second end located within the annular recess, the fastener being fluidly separated from the fluid channel.

2. The filter press of claim 1 wherein the fluid channel at least partially defines the at least one filtrate outlet channel.

3. The filter press of claim 1 wherein the press skeleton further comprises an aperture configured to receive a connection pipe fluidly coupled to the fluid channel.

4. The filter press of claim 3 wherein the first end of the fastener is received by the connection pipe.

5. The filter press of claim 3 wherein the connection pipe comprises a flange, and the first end of the fastener is received by the flange.

6. The filter press of claim 1 further comprising a ring disposed within the annular recess and coupled to the second end of the fastener.

7. The filter press of claim 6 further comprising a seal within the annular recess, with the seal covering the ring and second end of the fastener.

8. The filter press of claim 7 wherein the seal comprises an outer surface that confronts the filter plate.

9. The filter press of claim 1 wherein the plate body comprises a material selected from the group consisting of a polymeric material, fiberglass material, or composite material.

10. A connection plate assembly for a filter press, comprising:
    a plate body having spaced first and second sides defining an axial direction;
    a fluid channel extending through the plate body in the axial direction between the first and second sides;
    an annular recess within the plate body, surrounding and spaced from the fluid channel; and
    a fastener having a first end extending from the first side of the plate body and a second end located within the annular recess, the fastener being fluidly separated from the fluid channel.

11. The connection plate assembly of claim 10 wherein the fluid channel at least partially defines a filtrate outlet channel for the filter press.

12. The connection plate assembly of claim 10 wherein the annular recess comprises an inner surface spaced from the first and second sides of the plate body, and an axial wall joined to the inner surface.

13. The connection plate assembly of claim 12 wherein the axial wall extends to the second side of the plate body.

14. The connection plate assembly of claim 10 further comprising a ring disposed within the annular recess and coupled to the second end of the fastener.

15. The connection plate assembly of claim 14 wherein the ring is welded to the second end of the fastener.

16. The connection plate assembly of claim 15 further comprising a seal within the annular recess, with the seal covering the ring and second end of the fastener.

17. The connection plate assembly of claim 16 wherein the seal comprises an outer surface that is coplanar with the second side of the plate body.

18. The connection plate assembly of claim 10 wherein the first end of the fastener comprises a connecting portion configured to secure to a component of the filter press, and wherein the second end of the fastener comprises a head portion located within the annular recess.

19. The connection plate assembly of claim 10 wherein the plate body comprises a material selected from the group consisting of polymeric material, fiberglass material, or composite material.

20. The connection plate assembly of claim 19 wherein the fastener comprises a metallic material.

* * * * *